United States Patent [19]

Itoh et al.

[11] Patent Number: 5,024,926

[45] Date of Patent: Jun. 18, 1991

[54] ALKYLPHTHALOCYANINE NEAR-INFRARED ABSORBERS AND RECORDING/DISPLAY MATERIALS USING THE SAME

[75] Inventors: Hisato Itoh, Yokohama; Katashi Enomoto, Zushi; Takahisa Oguchi; Tsutomu Nishizawa, both of Yokohama, all of Japan

[73] Assignees: Mitsui Toatsu Chemicals, Incorporated, Tokyo; Yamamoto Chemicals, Incorporated, Yao, both of Japan

[21] Appl. No.: 593,255

[22] Filed: Oct. 1, 1990

Related U.S. Application Data

[63] Continuation of Ser. No. 331,736, Apr. 3, 1989, abandoned.

[30] Foreign Application Priority Data

Apr. 1, 1988 [JP] Japan .................................. 63-78049
Jun. 2, 1988 [JP] Japan ................................. 63-134446

[51] Int. Cl.$^5$ .................. G03C 1/00; C09B 47/04; G11B 7/24

[52] U.S. Cl. ......................... 430/495; 430/270; 430/945; 540/128; 540/135; 540/140

[58] Field of Search ....................... 430/270, 495, 945; 540/128, 135, 140

[56] References Cited

U.S. PATENT DOCUMENTS

| | | | |
|---|---|---|---|
| 3,764,361 | 10/1973 | Kienzle et al. | 540/140 |
| 4,529,688 | 7/1985 | Law et al. | 430/494 |
| 4,606,859 | 8/1986 | Duggan et al. | 540/122 |
| 4,798,781 | 1/1989 | Hirose et al. | 430/270 |
| 4,816,386 | 3/1989 | Gotoh et al. | 430/495 |

*Primary Examiner*—Charles L. Bowers, Jr.
*Assistant Examiner*—Ashley I. Pezzner
*Attorney, Agent, or Firm*—Oblon, Spivak, McClelland, Maier & Neustadt

[57] ABSTRACT

Near-infrared absorbers which contain phthalocyanine derivatives in which the four benzene rings contained in the molecule independently have 1 to 4 substituents are light and thermal resistant and possess high molar extinction coefficients. Such near-infrared absorbers are useful in optical recording media, near-infrared absorption filters, and liquid crystal display devices.

8 Claims, No Drawings

ALKYLPHTHALOCYANINE NEAR-INFRARED ABSORBERS AND RECORDING/DISPLAY MATERIALS USING THE SAME

This application is a continuation of application Ser. No. 07/331,736, filed on Apr. 3, 1989, now abandoned.

BACKGROUND OF THE INVENTION

1. Field of the Invention

The present invention relates to alkylphthalocyanine near-infrared absorbers. It also relates to recording and display materials fabricated with such near-infrared absorbers, including optical recording media (such as optical disks and optical cards), filters which absorb or screen near-infrared radiation (such as goggles), and liquid crystal display panels using near-infrared radiation.

2. Discussion of the Background

Near-infrared absorbers play an important role in optoelectronic applications such as information recording media, display media, sensors, and goggles.

Conventionally known near-infrared absorbers include cyanine dyes (Japanese Patent Laid-Open Nos. 46221/'81 and 112790/'83), phthalocyanine dyes (Japanese Patent Laid-Open No. 36490/'83), naphthoquinone dyes (Japanese Patent Laid-Open No. 15458/'85), anthraquinone dyes (Japanese Patent Laid-Open No. 291651/'86), and dithiol complexes (Japanese Patent Laid-Open No. 175693/'83).

However, the previously known dyes suffer from major disadvantages. Specifically, cyanine dyes are insufficient in fastness properties such as light resistance and thermal resistance. The absorption wavelength ranges of phthalocyanine dyes are as short as 600–700 nm. Anthraquinone and naphthoquinone dyes have a low molar extinction coefficient, on the order of several tens of thousands. Dithiol complexes are not sufficiently thermally stable and possess low molar extinction coefficients.

Thus, there remains a need for near-infrared absorbers which possess a sufficient degree of fastness properties, such as light resistance, weather resistance, and thermal resistance, and sufficiently high molar extinction coefficients.

SUMMARY OF THE INVENTION

It is, therefore, an object of the present invention to provide near-infrared absorbers which absorb light in the near-infrared region of 700 to 850 nm, have excellent light resistance, weather resistance, and thermal resistance and possess high molar extinction coefficients.

It is another object of the present invention to provide an optical recording medium containing such a near-infrared absorber in the recording layer thereof, a near-infrared absorption filter containing such a near-infrared absorber, and a display material comprising a mixture of such a near-infrared absorber and a liquid crystal material.

These and other objects which will become apparent during the course of the following detailed description have been achieved by near-infrared absorbers comprising a phthalocyanine derivative of the formula (I)

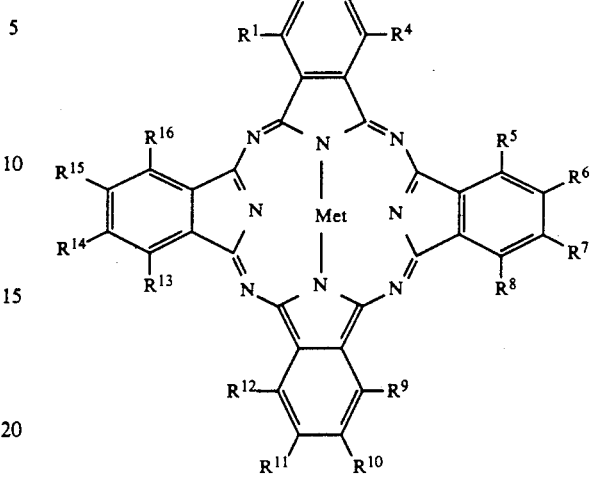

where $R^1$, $R^4$, $R^5$, $R^8$, $R^9$, $R^{12}$, $R^{13}$, and $R^{16}$ independently represent hydrogen, alkyl, arylmethyl, alkoxymethyl, alkylthiomethyl, alkylaminomethyl, dialkylaminomethyl, aryloxymethyl, arylthiomethyl, arylaminomethyl, diarylaminomethyl, or alkylarylaminomethyl; $R^2$, $R^3$, $R^6$, $R^7$, $R^{10}$, $R^{11}$, $R^{14}$, and $R^{15}$ independently represent hydrogen, alkyl, arylmethyl, alkoxymethyl, alkylthiomethyl, alkylaminomethyl, dialkylaminomethyl, aryloxymethyl, arylthiomethyl, arylaminomethyl, diarylaminomethyl, alkylarylaminomethyl, alkylthio, arylthio, alkoxy, aryloxy, aryl, or halogen; and Met represents two hydrogen atoms, a divalent metal atom, a monosubstituted trivalent metal atom, a disubstituted tetravalent metal atom, or an oxymetal group.

In addition, the present invention also provides an optical recording media containing the present near-infrared absorber in the recording layer thereof, near-infrared absorption filters containing the present near-infrared absorber, and display materials comprising a mixture of the present near-infrared absorber and a liquid crystal material.

DETAILED DESCRIPTION OF THE PREFERRED EMBODIMENTS

The present invention will be more specifically described below in connection with preferred embodiments.

Examples of the alkyl groups represented by $R^1$ to $R^{16}$ in formula (I) include straight-chain, branched and cyclic hydrocarbon radicals having 1 to 20 carbon atoms, such as methyl, ethyl, n-propyl, isopropyl, n-butyl, sec-butyl, tert-butyl, n-amyl, isoamyl, neopentyl, n-hexyl, cyclohexyl, 2-ethylhexyl, 3,3,5-trimethylhexyl, n-octyl, heptyl, and nonyl groups.

Among others, alkyl groups especially suitable for use as $R^1$, $R^4$, $R^5$, $R^8$, $R^9$, $R^{12}$, $R^{13}$, and $R^{16}$ are hydrocarbon radicals having 5 to 12 carbon atoms, such as n-amyl, isoamyl, neopentyl, n-hexyl, 2-ethylbutyl, n-heptyl, cyclohexylmethyl, n-octyl, 2-ethylhexyl, n-nonyl, 3,5,5-trimethylhexyl, n-decyl, and 4-butylcyclohexylmethyl groups.

Examples of the arylmethyl groups represented by $R^1$ to $R^{16}$ in formula (I) include benzyl groups having 0 to 5 substituents, such as benzyl, 4-methylbenzyl, 4- ethylbenzyl, 4-propylbenzyl, 4-butylbenzyl, 4-cyclohexylbenzyl, 2-ethylbenzyl, 2-hexylbenzyl, 3-butylbenzyl, methoxybenzyl, methylthiobenzyl, chlorobenzyl, and methylaminobenzyl groups; naphthylmethyl groups having 0 to 9 substituents, such as the ethylnaphthylmethyl group; and heteroarylmethyl groups such as substituted or unsubstituted thienylmethyl, furfuryl and indolylmethyl groups.

Among others, arylmethyl groups especially suitable for use as $R^1$, $R^4$, $R^5$, $R^8$, $R^9$, $R^{12}$, $R^{13}$, and $R^{16}$ are hydrocarbon radicals having 7 to 12 carbon atoms, such as benzyl, 4-butylbenzyl and naphthylmethyl groups.

Examples of the alkoxymethyl groups include methyl groups having a substituent selected from: straight-chain or branched hydrocarbonoxy groups having 1 to 20 carbon atoms, such as methoxy, ethoxy, propoxy, butoxy, pentyloxy, hexyloxy, heptyloxy and octyloxy groups; oligoethyloxy derivatives of the general formula $R-(OCHY^1CHY^2)_n-O-$ (where R represents a hydrogen atom or an alkyl group having 1 to 6 carbon atoms, $Y^1$ and $Y^2$ independently represent a hydrogen atom, methyl group, chloromethyl group, or alkoxymethyl group, and n is an integer of 1 to 5), such as methoxyethoxy, ethoxyethoxy, propoxyethoxy, butoxyethoxy, phenoxyethoxy, methoxyethoxyethoxy, ethoxyethoxyethoxy, methoxyethoxyethoxyethoxy, hydroxyethyloxy, and hydroxyethoxyethoxy groups; alkylaminoalkoxy groups, such as N,N-dimethylaminoethoxy, N,N-diethylaminoethoxy, N,N-dimethylaminopropoxy groups; and alkylthioalkoxy groups, such as ethylthioethoxy, methylthioethoxy, phenylthioethoxy, methylthiopropoxy and ethylthiopropoxy groups.

Examples of the alkylthiomethyl groups include methyl groups having a substituent selected from: straight-chain or branched hydrocarbonthio groups having 1 to 30 carbon atoms, such as methylthio and ethylthio groups oligoalkoxyalkylthio groups such as methoxymethylthio, methoxyethylthio, ethoxyethylthio, butoxyethylthio, and methoxyethoxyethylthio groups; oligoalkylthioalkylthio groups such as methylthiomethylthio and ethylthioethylthio groups; alkylaminoalkylthio groups such as N,N-dimethylaminoethylthio, N,N-diethylaminoethylthio, and N-methylaminopropylthio groups; and halogenated alkylthio groups such as chloroethylthio, bromoethylthio, iodoethylthio, fluoroethylthio, and dichloroethylthio groups.

Examples of the alkylaminomethyl and dialkylaminomethyl groups include methyl groups having a substituent selected from: straight-chain or branched alkyl-substituted amino groups having a total of 1 to 30 carbon atoms, such as methylamino, ethylamino, N,N-dimethylamino, and N,N-diethylamino groups; hydroxyalkylamino groups, such as N-(hydroxyethyl)amino and N,N-di(hydroxyethyl)amino groups; alkoxyalkylamino groups, such as N,N-di(methoxyethyl)amino, N,N-di(ethoxyethyl)amino and N,N-di(methoxyethoxyethyl)amino groups; and acyloxyalkylamino groups, such as the N,N-di(acetoxyethyl)amino group.

Examples of the aryloxymethyl groups include methyl groups having a substituent selected from phenyloxy, naphthyloxy, alkylphenyloxy, alkylaminophenyloxy, halogen-substituted phenyloxy, nitrophenyloxy, alkoxyphenyloxy, and alkylthiophenyloxy groups.

Examples of the arylthiomethyl groups include methyl groups having a substituent selected from phenylthio, naphthylthio, alkylphenylthio, aminophenylthio, alkylaminophenylthio, and alkoxyphenylthio groups. Examples of the arylaminomethyl and diarylaminomethyl groups include methyl groups substituted with an amino group having one or two substituents selected from phenyl, alkylphenyl alkoxyphenyl, aminophenyl, dialkylaminophenyl, halophenyl, naphthyl, and heterocyclic aromatic groups. Examples of the alkylarylaminomethyl groups include methyl groups substituted with an amino group having aromatic and aliphatic substituent groups, such as phenylmethylamino or naphthylethylamino groups.

When the total number of carbon, oxygen, nitrogen, and sulfur atoms present in each of the substituent groups represented by $R^1$, $R^4$, $R^5$, $R^8$, $R^9$, $R^{12}$, $R^{13}$, and $R^{16}$ is in the range of 5 to 12, the near-infrared absorbers of the present invention have good solvent solubility, exhibit high molar extinction coefficients in the solution phase, and can give coating films having a high reflectance. Similarly, when the total number of carbon, oxygen, nitrogen, and sulfur atoms present in each of the substituent groups represented by $R^2$, $R^3$, $R^6$, $R^7$, $R^{10}$, $R^{11}$, $R^{14}$, and $R^{15}$ is in the range of 1 to 6, the near-infrared absorbers of the present invention give coating films having a high reflectance.

Examples of the divalent metal represented by Met include Cu, Zn, Fe(II), Co(II), Ni(II), Ru(II), Rh(II), Pd(II), Pt(II), Mn(II), Mg(II), Be(II), Ca(II), Ba(II), Cd(II), Hg(II), and Sn(II). Examples of the monosubstituted trivalent metal include Al-Cl, Al-Br, Al-F, Al-I, Ga-Cl, Ga-F, Ga-I, Ga-Br, In-Cl, In-Br, In-I, In-F, Tl-Cl, Tl-Br, Tl-I, Tl-F, Al-$C_6H_5$, Al-$C_6H_4CH_3$, In-$C_6H_5$, In-$C_6H_4CH_3$, In-$C_{10}H_7$, and Mn(OH).

Examples of the disubstituted tetravalent metal include $CrCl_2$, $SiCl_2$, $SiBr_2$, $SiF_2$, $ZrCl_2$, $SiI_2$, $GeCl_2$, $GeBr_2$, $GeI_2$, $GeF_2$, $SnCl_2$, $SnBr_2$, $SnI_2$, $SnF_2$, $TiCl_2$, $TiBr_2$, and $TiF_2$; $Si(OH)_2$, $Ge(OH)_2$, $Zr(OH)_2$, $Mn(OH)_2$, and $Sn(OH)_2$; $TiR_2$, $CrR_2$, $SiR_2$, $SnR_2$, and $GeR_2$, where R is an alkyl, phenyl, or naphthyl group or a derivative thereof; $Si(OR')_2$, $Sn(OR')_2$, $Ge(OR')_2$, $Ti(OR')_2$, and $Cr(OR')_2$, where R' is an alkyl, phenyl, naphthyl, trialkylsilyl, dialkylalkoxysilyl, or acyl group or a derivative thereof; and $Sn(SR'')_2$ and $Ge(SR'')_2$, where R'' is an alkyl, phenyl, or naphthyl group or a derivative thereof.

Examples of the oxymetal group include VO, MnO, and TiO.

It is preferred that both of $R^1$ and $R^4$, $R^5$ and $R^8$, $R^9$ and $R^{12}$, or $R^{13}$ and $R^{16}$ should not be hydrogen atoms.

When eight or more of the $R^1$ to $R^{16}$ radicals are not hydrogen atoms, the central metal represented by Met preferably is vanadyl(IV) oxide because the resulting phthalocyanine derivatives absorb light in the wavelength range (750–850 nm) of semiconductor lasers. When four or more of the $R^1$ to $R^{16}$ radicals are not hydrogen atoms, a lead or manganese (III) derivative is preferred for the same reason.

Suitable manganese derivatives are manganese hydroxide derivatives of the general formula MnOY, such as Mn(OH), Mn[OSi($CH_3$)$_3$], Mn[OSi($C_2H_5$)$_3$], Mn[OSi($C_3H_7$)$_3$], Mn[OSi($C_4H_9$)$_3$], Mn[OSi($C_8H_{17}$)$_3$], Mn[OSn($C_4H_9$)$_3$], Mn[OGe($CH_3$)$_3$], Mn(OCH$_3$), Mn(O$C_6H_5$), Mn(O$C_2H_4$O$C_2H_4$O$C_2H_5$), and Mn[O$C_2H_4$N($CH_3$)$_2$].

The near-infrared absorbers of the present invention, which fall within the scope of formula (I), can be synthesized as follows: One to four intermediates are selected from the compounds represented by the formulas (II) and (III):

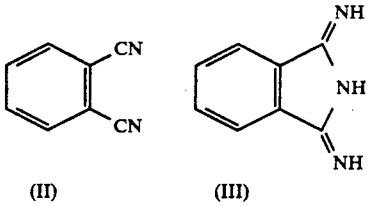

in which the benzene ring may have one or more substituent groups similar to those defined for formula (I). The intermediate or intermediates are reacted with a metal derivative such as a metal halide, acetate, or sulfate, for example, by heating in a solvent selected from urea, chloronaphthalene, halobenzenes, nitrobenzene, alcohols, and amino-alcohols.

In order to make optical recording media using a near-infrared absorber in accordance with the present invention, the near-infrared absorber may be coated or vacuum-deposited onto a transparent substrate. According to one coating process, 0.05 to 20% by weight, preferably 0.5 to 20% by weight, of the near-infrared absorber and up to 20% by weight, preferably 0%, of a binder resin are dissolved in a solvent, and the resulting solution is applied to a substrate by means of a spin coater. According to one vacuum deposition process, the near-infrared absorber is deposited onto a substrate at a pressure of $10^{-7}$ to $10^{-5}$ torr and a temperature of 100° to 300° C.

The substrate for the recording medium may be formed of any optically transparent resin. Suitable resins include, for example, acrylic resins, polyethylene resin, vinyl chloride resin, vinylidene chloride resin, polycarbonate resins, ethylene resin, polyolefin copolymer resins, vinyl chloride copolymer resins, vinylidene chloride copolymer resins, and styrene copolymer resins.

Moreover, the substrate may be surface-treated with a thermosetting or ultraviolet-curable resin.

Solvents suitable for coating purposes include, for example, halogenated hydrocarbons such as dichloromethane, chloroform, carbon tetrachloride, tetrachloroethylene, and dichlorodifluoroethane; ethers such as tetrahydrofuran, diethyl ether, and dibutyl ether; ketones such as acetone and methyl ethyl ketone; alcohols such as methanol, ethanol, and propanol; cellosolves such as methyl cellosolve and ethyl cellosolve; and hydrocarbons such as hexane, cyclohexane, octane, benzene, toluene, and xylene.

In order to make near-infrared absorption filters using a near-infrared absorber within the scope of formula (I), various methods may be employed. For example, this can be accomplished by mixing a resin with a compound of formula (I) and molding the mixture; by pouring a mixture of a resin monomer and a compound of formula (I) into a mold and polymerizing the monomer; by dyeing a resin molding with a compound of formula (I); or by coating or vacuum-depositing a compound of formula (I) onto a surface of a substrate material.

As the base material of such filters, there may be used any transparent resin. Suitable resins include, for example, thermoplastic resins such as polystyrene, polymethyl methacrylate, polycarbonates, polyethylene, and polypropylene; and thermosetting resins such as CR-39 (a product of PPG, Ltd.), MR-3 and MR-6 (products of Mitsui-Toatsu Chemicals Co., Ltd.).

Furthermore, display materials can be made by mixing a near-infrared absorber of formula (I) with liquid crystal materials such as nematic liquid crystals, smectic liquid crystals, and cholesteric liquid crystals. These display materials may be used in guest-host type displays, liquid crystal panels (in which a near-infrared absorber is incorporated in the liquid crystal and an image is written with a laser beam), and the like.

Other features of the present invention will become apparent in the course of the following descriptions of exemplary embodiments which are given for illustration of the invention and are not intended to be limiting thereof.

EXAMPLES

In these examples, all parts are parts by weight.

EXAMPLE 1

A reaction mixture composed of 72 parts of tetramethylphthalonitrile, 11 parts of vanadium(III) chloride, 1 part of ammonium molybdate, and 1,000 parts of 1-chloronaphthalene was heated under reflux at 220° C. for 30 hours. Thereafter, the reaction mixture was poured into 3,000 parts of methanol. The precipitated crystals were purified by column chromatography to obtain 30 parts of vanadyloxy hexadecamethylphthalocyanine. Its absorption maximum ($\lambda_{max}$) in CHCl$_3$ was 732 nm.

The results of elemental analysis of the thus-obtained phthalocyanine derivative are given below.

|        | C (%) | H (%) | N (%) |
| --- | --- | --- | --- |
| Calcd. | 71.71 | 6.02 | 13.94 |
| Found  | 71.02 | 5.91 | 14.01 |

Then, a 20 g/l chloroform solution of the same phthalocyanine derivative was prepared. When this solution was spin-coated onto glass, the resulting film had a reflectance of 28% at 810 nm. Moreover, an optical recording medium was made by coating the above solution onto an optical disk substrate formed of a photopolymer. The resulting optical disk exhibited a sensitivity of 50 dB when a record was made with a 780 nm laser beam of 7 mW power (on the surface of the substrate) at a rotational speed of 1,800 rpm. This optical disk had good stability to reproducing light and good storage stability.

EXAMPLE 2

A liquid crystal panel was made by using an alkylcyanobiphenyl liquid crystal material of the general formula

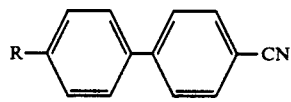

(where R is an alkyl group) and incorporating therein 0.7% by weight of the phthalocyanine derivative obtained in Example 1. For purposes of comparison, a liquid crystal panel in which the phthalocyanine derivative was not incorporated was also made. For both liquid crystal panels, the thickness of the liquid crystal layer was 10 μm.

The liquid crystal panel of the present invention gave a greater writing line width than the conventional liquid crystal panel. When the laser output was 20 mW, the liquid crystal panel of the present invention permitted the light pen to write a line of 160 μm width at a light pen traveling speed of 2 cm/sec.

The same phthalocyanine derivative could be dissolved in the alkylcyanobiphenyl liquid crystal material at a concentration up to about 2% by weight, and various weathering tests revealed that it possesses a very long service life.

Specifically, the liquid crystal material containing the phthalocyanine derivative was placed into capsules, which were allowed to stand under direct sunlight for 100 hours. Thereafter, the liquid crystal material was tested for changes in absorbance and absorption spectrum, but no changes were observed. Thus, this phthalocyanine derivative was found to be very stable.

EXAMPLE 3

One part of the phthalocyanine derivative obtained in Example 1 was dissolved in 10 parts of chloroform, and this solution was coated onto a glass substrate to form a near-infrared absorption filter. This filter had excellent weather resistance.

EXAMPLE 4

A reaction mixture composed of 72 parts of tetramethylphthalonitrile, 25 parts of manganese(II) acetylacetonate, 70 parts of diazabicycloundecene (DBU), 1 part of ammonium molybdate, and 1,000 parts of diethylene glycol was heated at 250° C. for 40 hours. Thereafter, the reaction mixture was poured into 10,000 parts of water containing 1,000 parts of hydrochloric acid. The precipitated crystals were filtered off to obtain 50 parts of hydroxymanganese(III) hexadecamethylphthalocyanine, $Mn(OH)(C_{32}N_8)(CH_3)_{16}$.

The results of elemental analysis of the thusobtained phthalocyanine derivative are given below.

|        | C (%) | H (%) | N (%) |
|--------|-------|-------|-------|
| Calcd. | 71.27 | 6.11  | 13.85 |
| Found  | 71.30 | 6.09  | 13.55 |

A reaction mixture composed of 10 parts of the above hydroxymanganese(III) hexadecamethylphthalocyanine, 25 parts of triisopropylsilyl chloride, and 500 parts of pyridine was heated under reflux for 10 hours. Thereafter, the solvent was removed by distillation, and the residue was extracted with chloroform. Thus, there was obtained 8 parts of triisopropylsilyloxymanganese(III) hexadecamethylphthalocyanine. Its absorption maximum ($\lambda_{max}$) in $CHCl_3$ was 800 nm.

The results of elemental analysis of the thusobtained phthalocyanine derivative are given below.

|        | C (%) | H (%) | N (%) |
|--------|-------|-------|-------|
| Calcd. | 70.84 | 7.20  | 11.70 |
| Found  | 69.98 | 7.02  | 11.50 |

One part of the above phthalocyanine derivative was dissolved in 100 parts of benzene, and the resulting solution was spin-coated onto a substrate to obtain an optical recording medium. When a record was made with a 780 nm semiconductor laser beam, the optical recording medium exhibited a C/N ratio of 60 dB at a power of 8 mW. No change was observed after the record was reproduced 1,000,000 times with a 0.5 mW laser beam. Moreover, reproduction of the record was not interferred with even after the optical recording medium was allowed to stand at a temperature of 80° C. and a relative humidity of 80% for 1,000 hours.

Moreover, 5 parts of the above phthalocyanine derivative was mixed with 1,000 parts of polystyrene resin, and the resulting mixture was hot-molded to form a filter. This filter effectively absorbed light in the wavelength range of 700 to 850 nm.

EXAMPLE 5

A reaction mixture composed of 80 parts of 3-n-amylphthalonitrile, 25 parts of manganese(II) acetylacetonate, 70 parts of DBU, 1 part of ammonium molybdate, and 1,000 parts of amyl alcohol was heated under reflux (at 138° C.) for 10 hours. Thereafter, the reaction mixture was poured into 10,000 parts of water containing 1,000 parts of concentrated hydrochloric acid. The oily material which separated was extracted with benzene and then washed with n-hexane to obtain 50 parts of hydroxymanganese tetraamylphthalocyanine. Its absorption maximum ($\lambda_{max}$) in $CHCl_3$ was 740 nm.

The results of elemental analysis of the thusobtained phthalocyanine derivative are given below.

|        | C (%) | H (%) | N (%) |
|--------|-------|-------|-------|
| Calcd. | 72.21 | 6.64  | 12.95 |
| Found  | 71.95 | 6.32  | 13.01 |

A 10 g/l methanol solution of the same phthalocyanine derivative was prepared. When this solution was coated onto an optical disk substrate formed of polycarbonate, the resulting optical disk had a reflectance of 28% and exhibited good sensitivity.

EXAMPLE 6

A reaction mixture composed of 80 parts of 3-n-amylphthalonitrile, 22 parts of lead monoxide, and 1,000 parts of amyl alcohol was heated under reflux for 10 hours. Thereafter, the reaction mixture was poured into water. The precipitated crystals were collected by filtration and then purified by column chromatography to obtain 20 parts of lead(II) tetraamylphthalocyanine. Its absorption maximum ($\lambda_{max}$) in $CHCl_3$ was 730 nm.

The results of elemental analysis of the thus-obtained phthalocyanine derivative are given below.

|        | C (%) | H (%) | N (%) |
|--------|-------|-------|-------|
| Calcd. | 62.45 | 5.64  | 11.20 |
| Found  | 62.10 | 5.53  | 11.30 |

An optical disk was made by spin-coating a 10 g/l n-octane solution of the same phthalocyanine derivative onto a polycarbonate substrate. This optical disk had a reflectance of 30% at 780-830 nm. Moreover, it exhibited a sensitivity of 50 dB when a record was made with a 780 nm laser beam of 7 mW power (on the surface of the substrate) at a rotational speed of 1,800 rpm.

EXAMPLE 7

Forty parts of tetra(p-tert-butylphenyloxymethyl)phthalonitrile, 5 parts of copper acetate, and 10 parts of DBU were reacted by refluxing in chloronaphthalene. Thereafter, the reaction mixture was poured into methanol. Thus, there was obtained 10 parts of copper hexadeca(p-tert-butylphenyloxymethyl)phthalocyanine.

The results of elemental analysis of the thus-obtained phthalocyanine derivative are given below.

|  | C (%) | H (%) | N (%) |
|---|---|---|---|
| Calcd. | 78.77 | 7.63 | 3.53 |
| Found | 79.01 | 7.48 | 3.43 |

One part of the same phthalocyanine derivative was dissolved in 100 parts of benzene, and the resulting solution was spin-coated onto a substrate to obtain an optical recording medium. This optical recording medium exhibited at C/N ratio of 60 dB and hence had good sensitivity.

EXAMPLE 8

Ten parts of copper hexadecachlorophthalocyanine was reacted with 100 parts of p-tert-butylbenzylmagnesium bromide to obtain 5 parts of copper hexadeca(p-tert-butylbenzyl)phthalocyanine. Its absorption maximum ($\lambda_{max}$) in $CHCl_3$ was 700 nm.

The results of elemental analysis of the thus-obtained phthalocyanine derivative are given below.

|  | C (%) | H (%) | N (%) |
|---|---|---|---|
| Calcd. | 85.71 | 5.59 | 5.55 |
| Found | 85.39 | 5.63 | 5.43 |

EXAMPLE 9

Forty parts of tetra(p-tert-butylphenylthiomethyl)phthalonitrile was reacted with 5 parts of vanadyl trichloride in chloronaphthalene. Thereafter, the reaction mixture was poured into methanol. Thus, there was obtained 5 parts of vanadyloxy hexadeca(p-tert-butylphenylthiomethyl)phthalocyanine.

The results of elemental analysis of the thus-obtained phthalocyanine derivative are given below.

|  | C (%) | H (%) | N (%) |
|---|---|---|---|
| Calcd. | 72.79 | 7.05 | 3.26 |
| Found | 72.50 | 6.97 | 3.00 |

EXAMPLE 10

Twenty parts of 1-amyl-4-methylphthalocyanine was reacted with 3 parts of vanadium(III) trichloride by refluxing in 60 parts of chloronaphthalene. Thereafter, the reaction mixture was poured into 300 parts of methanol. The precipitate which formed was collected by filtration, dried, and then purified by column chromatography (silica gel/toluene) to obtain 10 parts of vanadyloxy tetraamyltetramethylphthalocyanine. Its absorption maximum ($\lambda_{max}$) in toluene was 720 nm.

The results of elemental analysis are given below.

|  | C (%) | H (%) | N (%) |
|---|---|---|---|
| Calcd. | 73.42 | 7.04 | 12.23 |
| Found | 73.21 | 7.15 | 12.31 |

Ten parts of the same phthalocyanine derivative was dissolved in 1,000 parts of dibutyl ether. This solution was coated onto an optical card substrate formed of polycarbonate, and the coated surface was covered with a protective layer to obtain an optical card. On this optical card, a record could be made with a 780 nm semiconductor laser beam of 4 mW power at a linear speed of 2 m/sec. As a result, the optical card exhibited a C/N ratio of 50 dB. Moreover, this record could be reproduced with a 0.8 mW laser beam. The optical card was found to have good stability to reproducing light, because the reproduction could be repeated $10^5$ times. Moreover, the optical card also had good storage stability.

EXAMPLE 11

26.8 parts of 1,4-dihexylphthalonitrile was reacted with 3 parts of vanadyl(III) trichloride by refluxing in chloronaphthalene for 3 hours. Thereafter, the reaction mixture was poured into 2,000 parts of methanol. The precipitated solid was collected by filtration, dried, and then purified by column chromatography (silica gel/toluene) to obtain 15 parts of vanadyloxy octahexylphthalocyanine. Its absorption maximum ($\lambda_{max}$) in toluene was 720 nm.

The results of elemental analysis are given below.

|  | C (%) | H (%) | N (%) |
|---|---|---|---|
| Calcd. | 76.70 | 9.01 | 8.94 |
| Found | 77.01 | 8.93 | 8.87 |

Fifteen parts of the same phthalocyanine derivative was dissolved in 1,000 parts of octane. This solution was spin-coated onto a substrate to obtain an optical disk. This optical disk had a reflectance of 35% at 780 nm. Moreover, it exhibited a C/N ratio (or sensitivity) of 50 dB when a record was made with a 8 mW laser beam at a linear speed of 11 m/sec. Furthermore, this optical disk had good stability to reproducing light and good storage stability.

EXAMPLE 12

36.4 parts of tetraamylphthalonitrile was reacted with 3 parts of vanadium(III) trichloride by refluxing in 150 parts of chloronaphthalene for 3 hours. Thereafter, the reaction mixture was poured into 3,000 parts of methanol. The precipitated crystals were collected by filtration, dried, and then purified by column chromatography (silica gel/toluene) to obtain 10 part of vanadyloxy hexadecaamylphthalocyanine. Its absorption maximum ($\lambda_{max}$) in toluene was 740 nm.

The results of elemental analysis are given below.

|  | C (%) | H (%) | N (%) |
|---|---|---|---|
| Calcd. | 79.05 | 10.43 | 6.59 |
| Found | 78.95 | 10.13 | 6.49 |

For some of the compounds obtained in the foregoing examples, the absorption maximum ($\lambda_{max}$) in solution and in film form, the maximum reflectance in film form, and the durability were evaluated. The thus-obtained results are shown in Table 1. In addition, the results of three comparative examples in which conventional absorbers were evaluated in the same manner are also shown in Table 1.

TABLE 1

| | $\lambda_{max}$ | | Maximum reflectance[f] | Moisture | Thermal |
|---|---|---|---|---|---|
| | Solution[d] | Film[f] | (nm)/(%) | resistance | resistance |
| Compounds of | | | | | |

TABLE 1-continued

| the present invention | | | | | |
|---|---|---|---|---|---|
| Example 1 | 732 | 745 | 800/29 | O | O |
| Example 4 | 800 | 810 | 850/26 | O | O |
| Example 5 | 740 | 752 | 780/31 | O | O |
| Example 11 | 720 | 760 | 800/35 | O | O |
| Conventional absorbers | | | | | |
| Comparative Example 1[a] | 806 | 820 | 830/15 | O | O |
| Comparative Example 2[b] | 740 | 780 | 830/25 | X | X |
| Comparative Example 3[c] | 678[e] | 710[g] | 720/35[g] | O | O |

O = good
X = poor
Notes to Table 1:
[a]An absorber which is described in Japanese Patent Laid-Open No. 25886/'86 (Example 1):

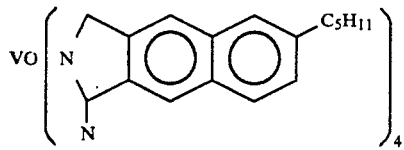

[b]An absorber which is described in Japanese Patent Laid-Open No. 112790/'83 (Example 3):

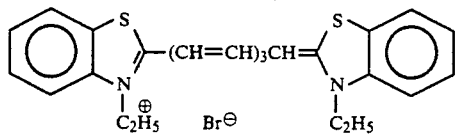

[c]An absorber which is described in Japanese Patent Laid-Open No. 36490/'83:

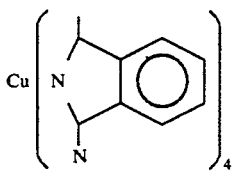

TABLE 1-continued

[d]A chloroform solution.
[e]A chloronaphthalene solution.

EXAMPLES 13 TO 79

In these examples, there were used a total of 52 intermediates (Intermediates 1 to 52 shown in Table 2) of the general formula (IV):

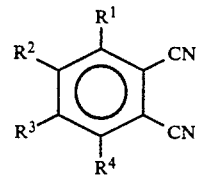

Using 1 to 4 of these intermediates, a variety of phthalocyanine derivatives were synthesized in the same manner as described in the foregoing examples. The intermediate(s), metal, and reaction conditions used in each example, together with the absorption maximum ($\lambda_{max}$) of the resulting compound in solution, are shown in Table 3.

These near-infrared absorbers possess good compatibility with resins and give optical recording media having high sensitivity and good durability. When used in filters, they exhibit desirable spectral characteristics. Moreover, they possess good compatibility with liquid crystal compounds and give high contrast in liquid crystal display devices.

Obviously, numerous modifications and variations of the present invention are possible in light of the above teachings. It is therefore to be understood that within the scope of the appended claims, the invention may be practiced otherwise than as specifically described herein.

TABLE 2

| Intermediate | $R^1$ | $R^2$ | $R^3$ | $R^4$ |
|---|---|---|---|---|
| 1 | $-CH_2C_6H_5$ | $-CH_2C_6H_5$ | $-CH_2C_6H_5$ | $-CH_2C_6H_5$ |
| 2 | $-CH_2C_6H_4C(CH_3)_3$ | $-CH_2C_6H_4C(CH_3)_3$ | $-CH_2C_6H_4C(CH_3)_3$ | $-CH_2C_6H_4C(CH_3)_3$ |
| 3 | $-CH_2SC_6H_{13}(n)$ | $-CH_2SC_6H_{13}(n)$ | $-CH_2SC_6H_{13}(n)$ | $-CH_2SC_6H_{13}(n)$ |
| 4 | $-CH_2SC_6H_4C(CH_3)_3$ | $-CH_2SC_6H_4C(CH_3)_3$ | $-CH_2SC_6H_4C(CH_3)_3$ | $-CH_2SC_6H_4C(CH_3)_3$ |
| 5 | $-CH_2SC_{10}H_7$ | $-CH_2SC_{10}H_7$ | $-CH_2SC_{10}H_7$ | $-CH_2SC_{10}H_7$ |
| 6 | $-CH_2OC_8H_{17}(n)$ | $-CH_2OC_8H_{17}(n)$ | $-CH_2OC_8H_{17}(n)$ | $-CH_2OC_8H_{17}(n)$ |
| 7 | $-CH_2OC_6H_4C(CH_3)_3$ | $-CH_2OC_6H_4C(CH_3)_3$ | $-CH_2OC_6H_4C(CH_3)_3$ | $-CH_2OC_6H_4C(CH_3)_3$ |
| 8 | $-CH_2OC_{10}H_7$ | $-CH_2OC_{10}H_7$ | $-CH_2OC_{10}H_7$ | $-CH_2OC_{10}H_7$ |
| 9 | $-CH_2NHC_6H_4C_8H_{17}$ | $-CH_2NHC_6H_4C_8H_{17}$ | $-CH_2NHC_6H_4C_8H_{17}$ | $-CH_2NHC_6H_4C_8H_{17}$ |
| 10 | $-CH_2N(C_6H_5)_2$ | $-CH_2N(C_6H_5)_2$ | $-CH_2N(C_6H_5)_2$ | $-CH_2N(C_6H_5)_2$ |
| 11 | $-CH_2N(C_4H_9)_2$ | $-CH_2N(C_4H_9)_2$ | $-CH_2N(C_4H_9)_2$ | $-CH_2N(C_4H_9)_2$ |
| 12 | $-CH_2NHC_{12}H_{25}$ | $-CH_2NHC_{12}H_{25}$ | $-CH_2NHC_{12}H_{25}$ | $-CH_2NHC_{12}H_{25}$ |
| 13 | $-CH_2N(CH_3)(C_{10}H_7)$ | $-CH_2N(CH_3)(C_{10}H_7)$ | $-CH_2N(CH_3)(C_{10}H_7)$ | $-CH_2N(CH_3)(C_{10}H_7)$ |
| 14 | $-CH_2C_6H_4C(CH_3)_3$ | $-H$ | $-H$ | $-CH_2C_6H_4C(CH_3)_3$ |
| 15 | $-H$ | $-CH_2C_6H_5$ | $-CH_2C_6H_5$ | $-CH_2C_6H_5$ |
| 16 | $-CH_2C_6H_4Cl$ | $-CH_2C_6H_4Cl$ | $-CH_2C_6H_4OCH_3$ | $-CH_2C_6H_4OCH_3$ |
| 17 | $-CH_2O(C_2H_4O)_3H$ | $-CH_2O(C_2H_4O)_3H$ | $-CH_2O(C_2H_4O)_3H$ | $-CH_2O(C_2H_4O)_3H$ |
| 18 | $-CH_2O(C_2H_4)_2C_2H_5$ | $-CH_2O(C_2H_4)_2C_2H_5$ | $-CH_2O(C_2H_4)_2C_2H_5$ | $-CH_2O(C_2H_4)_2C_2H_5$ |
| 19 | $-C_5H_{11}(iso)$ | $-CH_3$ | $-CH_3$ | $-C_5H_{11}(iso)$ |
| 20 | $-CH_2CH(C_2H_5)C_4H_9$ | $-C_2H_5$ | $-C_2H_5$ | $-CH_2CH(C_2H_5)C_4H_9$ |
| 21 | $-CH_2CH(C_2H_5)C_4H_9$ | $-Cl$ | $-Cl$ | $-CH_2CH(C_2H_5)C_4H_9$ |
| 22 | $-C_5H_{11}(iso)$ | $-SC_6H_5$ | $-SC_6H_5$ | $-C_5H_{11}(iso)$ |
| 23 | $-C_6H_{13}(n)$ | $-C_6H_5$ | $-C_6H_5$ | $-C_6H_{13}(n)$ |
| 24 | $-C_6H_{13}$ | $-Cl$ | $-Cl$ | $-CH_3$ |
| 25 | $-C_8H_{17}$ | $-CH_3$ | $-CH_3$ | $-C_8H_{17}$ |
| 26 | $-CH_2C_6H_4C(CH_3)_3$ | $-CH_3$ | $-CH_3$ | $-CH_2C_6H_4C(CH_3)_3$ |
| 27 | $-C_4H_9(n)$ | $-H$ | $-H$ | $-C_4H_9(n)$ |
| 28 | $-C_6H_{13}(n)$ | $-H$ | $-H$ | $-C_6H_{13}(n)$ |
| 29 | $-C_7H_{15}(n)$ | $-H$ | $-H$ | $-C_7H_{15}(n)$ |
| 30 | $-C_2H_5$ | $-H$ | $-H$ | $-C_2H_5$ |
| 31 | $-CH_3$ | $-CH_3$ | $-CH_3$ | $-CH_3$ |
| 32 | $-C_2H_5$ | $-C_2H_5$ | $-C_2H_5$ | $-C_2H_5$ |

TABLE 2-continued

| Intermediate | R$^1$ | R$^2$ | R$^3$ | R$^4$ |
|---|---|---|---|---|
| 33 | —C$_7$H$_{15}$(n) | —CH$_3$ | —CH$_3$ | —C$_7$H$_{15}$(n) |
| 34 | —C$_4$H$_9$(n) | —CH$_3$ | —CH$_3$ | —C$_4$H$_9$(n) |
| 35 | —C$_2$H$_5$ | —C$_3$H$_7$(iso) | —C$_3$H$_7$(iso) | —C$_2$H$_5$ |
| 36 | —CH$_3$ | —C$_5$H$_{11}$(n) | —C$_5$H$_{11}$(n) | —CH$_3$ |
| 37 | —C$_5$H$_{11}$ | —CH$_3$ | —CH$_3$ | —C$_5$H$_{11}$(n) |
| 38 | —CH$_2$CH[C(CH$_3$)$_3$]CH$_2$CH$_2$— | | —H | —C$_5$H$_{11}$(iso) |
| 39 | —CH$_2$CH$_2$CH$_2$CH$_2$— | | —H | —C$_8$H$_{17}$ |
| 40 | —CH$_3$ | —CH$_3$ | —CH$_3$ | —C$_6$H$_{13}$ |
| 41 | —C$_3$H$_7$ | —C$_3$H$_7$(n) | —CH$_3$ | —H |
| 42 | —C$_8$H$_{17}$ | —CH$_3$ | —CH$_3$ | —H |
| 43 | —C$_5$H$_{11}$ | —CH$_3$ | —CH$_3$ | —H |
| 44 | —C$_2$H$_5$ | —C$_2$H$_5$ | —C$_2$H$_5$ | —C$_5$H$_{11}$ |
| 45 | —C$_5$H$_{11}$ | —C$_5$H$_{11}$ | —C$_5$H$_{11}$ | —H |
| 46 | —C$_5$H$_{11}$ | —C$_3$H$_7$ | —C$_3$H$_7$ | —H |
| 47 | —C$_6$H$_{13}$ | —C$_8$H$_{17}$ | —C$_8$H$_{17}$ | —H |
| 48 | —C$_{20}$H$_{41}$ | —CH$_3$ | —CH$_3$ | —C$_{20}$H$_{41}$ |
| 49 | —CH$_2$CH(CH$_3$C$_2$H$_5$)CH(CH$_3$)— | —C$_2$H$_5$ | —C$_2$H$_5$ | —CH$_2$CH(C$_2$H$_5$)C$_4$H$_9$ |
| 50 | —CH$_2$C(CH$_3$)$_2$C(CH$_3$)$_3$ | —H | —H | —H |
| 51 | —CH$_2$CH(C$_5$H$_{11}$)CH(CH$_3$)C$_7$H$_{15}$ | —H | —H | —H |
| 52 | n-C$_5$H$_{11}$ | —H | —H | —H |

TABLE 3

| Example | Intermediate | Metal | Reaction conditions | $\lambda_{max}$ |
|---|---|---|---|---|
| 13 | 1 | VO(acac)$_2$ | Refluxed in chloronaphthalene. | 730 |
| 14 | 1 | CuCl | Refluxed in chloronaphthalene. | 770 |
| 15 | 1 | Ni(OAc)$_2$ | Refluxed in chloronaphthalene. | 710 |
| 16 | 1 | Co(OAc)$_2$ | Refluxed in chloronaphthalene. | 705 |
| 17 | 2 | Ni(OAc)$_2$ | Refluxed in chloronaphthalene. | 705 |
| 18 | 2 | FeCl$_3$ | Refluxed in chloronaphthalene. | 708 |
| 19 | 2 | VCl$_3$ | Refluxed in chloronaphthalene. | 735 |
| 20 | 2 | H$_2$ | Reacted with metallic sodium in amyl alcohol and hydrolyzed with hydrochloric acid. | 725 |
| 21 | 1, 3 | VO(acac)$_2$ | Reacted in urea at 200° C. | 735 |
| 22 | 1 | SiCl$_4$ | Reacted in quinoline/tributylamine/DBU. | 710 |
| 23 | 1 | SnCl$_4$ | Reacted in quinoline/tributylamine/DBU. | 730 |
| 24 | 1 | | The product of Example 22 was hydrolyzed. | 710 |
| 25 | 1 | | The product of Example 23 was hydrolyzed. | 720 |
| 26 | 1 | | The product of Example 22 was reacted with PhMgBr. | 715 |
| 27 | 1 | | The product of Example 23 was reacted with PhMgBr. | 715 |
| 28 | 1 | | The product of Example 24 was reacted with trimethylsilyl chloride. | 710 |
| 29 | 1 | | The product of Example 25 was reacted with trimethylsilyl chloride. | 710 |
| 30 | 1 | GeCl$_4$ | Reacted in quinoline/tributylamine/DBU. | 710 |
| 31 | 1 | | The product of Example 30 was hydrolyzed. | 710 |
| 32 | 1 | | The product of Example 31 was reacted with thiophenol. | 710 |
| 33 | 3 | TiCl$_4$ | Reacted in quinoline/DBU. | 710 |
| 34 | 3 | AlCl$_3$ | Reacted in quinoline/DBU. | 710 |
| 35 | 3 | Cr(OAc)$_3$ | Reacted in quinoline/DBU. | 730 |
| 36 | 3 | PdCl$_2$ | Refluxed in N,N-dimethylaminoethanol. | 705 |
| 37 | 3 | RhCl$_3$ | Refluxed in N,N-dimethylaminoethanol. | 705 |
| 38 | 4 | CuCl | Refluxed in N,N-dimethylaminoethanol. | 715 |
| 39 | 6 | CuCl | Refluxed in N,N-dimethylaminoethanol. | 715 |
| 40 | 7 | CuCl | Refluxed in N,N-dimethylaminoethanol. | 715 |
| 41 | 8 | CuCl | Refluxed in N,N-dimethylaminoethanol. | 715 |
| 42 | 9 | CuCl | Refluxed in N,N-dimethylamino- | 725 |

TABLE 3-continued

| Example | Intermediate | Metal | Reaction conditions | $\lambda_{max}$ |
|---|---|---|---|---|
| | | | ethanol. | |
| 43 | 10 | CuCl | Refluxed in N,N-dimethylaminoethanol. | 725 |
| 44 | 11 | CuCl | Refluxed in N,N-dimethylaminoethanol. | 725 |
| 45 | 12 | CuCl | Refluxed in N,N-dimethylaminoethanol. | 725 |
| 46 | 1, 2, 3 | CuCl | Refluxed in N,N-dimethylaminoethanol. | 710 |
| 47 | 13 | CuCl | Refluxed in N,N-dimethylaminoethanol. | 715 |
| 48 | 14 | Pb | Refluxed in N,N-dimethylaminoethanol. | 750 |
| 49 | 15 | PbO | Refluxed in amyl alcohol/DBU for 20 hours. | 740 |
| 50 | 16 | Mn(acac)$_2$ | Refluxed in amyl alcohol/DBU for 20 hours. | 750 |
| 51 | 17 | VO(acac)$_2$ | Refluxed in amyl alcohol/DBU for 20 hours. | 742 |
| 52 | 18 | Mn(acac)$_2$ | Reacted in ethylene glycol/DBU/ammonium molybdate at 200° C. for 20 hours. | 750 |
| 53 | 19 | PbO | Reacted in ethylene glycol/DBU/ammonium molybdate at 200° C. for 20 hours. | 760 |
| 54 | 52 | | The product of Example 5 was reacted with ClSi(C$_8$H$_{17}$)$_3$. | 740 |
| 55 | 21 | VCl$_3$ | Refluxed in chloronaphthalene/ammonium molybdate for 20 hours. | 735 |
| 56 | 22 | VCl$_3$ | Refluxed in chloronaphthalene/ammonium molybdate for 20 hours. | 775 |
| 57 | 23 | VCl$_3$ | Refluxed in chloronaphthalene/ammonium molybdate for 20 hours. | 740 |
| 58 | 24 | VCl$_3$ | Refluxed in chloronaphthalene/ammonium molybdate for 20 hours. | 735 |
| 59 | 25 | Mn(acac)$_2$ | Reacted in diethylene glycol/DBU/ammonium molybdate at 250° C. for 30 hours. | 790 |
| 60 | 26 | Mn(acac)$_2$ | Reacted in diethylene glycol/DBU/ammonium molybdate at 250° C. for 30 hours. | 790 |
| 61 | 27 | Mn(acac)$_2$ | Reacted in diethylene glycol/DBU/ammonium molybdate at 250° C. for 30 hours. | 780 |
| 62 | 25 | | The product of Example 59 was reacted with ClSi(C$_3$H$_9$)$_3$. | 791 |
| 63 | 26 | | The product of Example 60 was reacted with ClSi(C$_3$H$_7$)$_3$. | 792 |
| 64 | 27 | | The product of Example 61 was reacted with ClGe(CH$_3$)$_3$. | 788 |
| 65 | 28 | VOCl$_2$ | Reacted in urea/ammonium molybdate at 250° C. for 2 hours. | 725 |
| 66 | 29 | VCl$_3$ | Reacted in chloronaphthalene/ammonium molybdate at 220° C. for 20 hours. | 725 |
| 67 | 30 | VO(acac)$_2$ | Reacted in diethylene glycol/DBU at 250° C. for 40 hours. | 725 |
| 68 | 31 | VO(acac)$_2$ | Reacted in diethylene glycol/DBU at 250° C. for 40 hours. | 735 |
| 69 | 32 | VCl$_3$ | Reacted in chloronaphthalene/ammonium molybdate at 220° C. | 740 |
| 70 | 33, 34 | VO(acac)$_2$ | Refluxed in amyl alcohol/DBU for 20 hours. | 740 |
| 71 | 35, 36 | VCl$_3$ | Reacted in chloronaphthalene/ammonium molybdate at 250° C. | 735 |
| 72 | 37, 40 | VCl$_3$ | Reacted in chloronaphthalene/ammonium molybdate at 250° C. | 735 |
| 73 | 38 | VCl$_3$ | Reacted in chloronaphthalene/ammonium molybdate at 250° C. | 735 |
| 74 | 39 | VCl$_3$ | Reacted in chloronaphthalene/ammonium molybdate at 250° C. | 735 |
| 75 | 41, 42 | PbO | Reacted in diethylene glycol/DBU at 250° C. for 30 hours. | 760 |
| 76 | 43, 44 45, 46 | PbO | Reacted in diethylene glycol/DBU at 250° C. for 30 hours. | 760 |
| 77 | 48 | PbO | Reacted in diethylene glycol/DBU at 250° C. for 30 hours. | 780 |
| 78 | 50, 51 | Mn(acac)$_2$ | Reacted in diethylene glycol/DBU at 250° C. for 30 hours. | 765 |
| 79 | 49 | Mn(acac)$_2$ | Reacted in diethylene glycol/DBU | 790 |

TABLE 3-continued

| Example | Intermediate | Metal | Reaction conditions | $\lambda_{max}$ |
|---------|--------------|-------|---------------------|-----------------|
|         |              |       | at 250° C. for 30 hours. |              |

What is claimed as new and desired to be secured by Letters Patent of the United States is:

1. A near-infrared absorber comprising a phthalocyanine derivative of the formula (I)

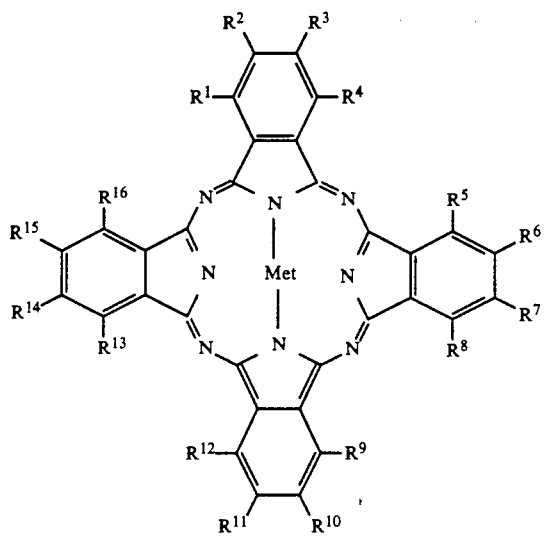

wherein $R^1$, $R^4$, $R^5$, $R^8$, $R^9$, $R^{12}$, $R^{13}$ and $R^{16}$ independently are alkyl, arylmethyl, alkoxymethyl, alkylthiomethyl, alkylaminomethyl, dialkylaminomethyl, aryloxymethyl, arylthiomethyl, arylaminomethyl, diarylaminomethyl or alkylarylaminomethyl, wherein the total number of carbon, oxygen, nitrogen and sulfur atoms present in each of $R^1$, $R^4$, $R^5$, $R^8$, $R^9$, $R^{12}$, $R^{13}$ and $R^{16}$ is in the range of 5 to 12; $R^2$, $R^3$, $R^6$, $R^7$, $R^{10}$, $R^{11}$, $R^{14}$ and $R^{15}$ independently are hydrogen, alkyl, arylmethyl, alkoxymethyl, alkylthiomethyl, alkylaminomethyl, dialkylaminomethyl, aryloxymethyl, arylthiomethyl, arylaminomethyl, diarylaminomethyl, alkylarylaminomethyl, alkylthio, arylthio, alkoxy, aryloxy or aryl, but none of $R^2$, $R^3$, $R^6$, $R^7$, $R^{10}$, $R^{11}$, $R^{14}$ and $R^{15}$ is hydrogen when all of $R^1$, $R^4$, $R^5$, $R^8$, $R^9$, $R^{12}$, $R^{13}$ and $R^{16}$ are all either aryloxymethyl or arylthiomethyl; and Met is two hydrogen atoms, a divalent metal atom, a monosubstituted trivalent metal atom, a disubstituted tetravalent metal atom or an oxymetal group.

2. The near-infrared absorber of claim 1, wherein $R^1$, $R^4$, $R^5$, $R^8$, $R^9$, $R^{12}$, $R^{13}$, and $R^{16}$ independently are alkyl or arylmethyl groups having 5 to 12 carbon atoms.

3. The near-infrared absorber of claim 1, wherein $R^2$, $R^3$, $R^6$, $R^7$, $R^{10}$, $R^{11}$, $R^{14}$ and $R^{15}$ independently are alkyl, arylmethyl, alkoxymethyl, alkylthiomethyl, alkylaminomethyl, dialkylaminomethyl, aryloxymethyl, arylthiomethyl, arylaminomethyl, diarylaminomethyl or alkylarylaminomethyl.

4. The near-infrared absorber of claim 2, wherein $R^2$, $R^3$, $R^6$, $R^7$, $R^{10}$, $R^{11}$, $R^{14}$ and $R^{15}$ independently are alkyl or arylmethyl groups having 5 to 12 carbon atoms.

5. An optical recording medium comprising a recording layer which comprises a near-infrared absorber comprising a phthalocyanine derivative of the formula (I)

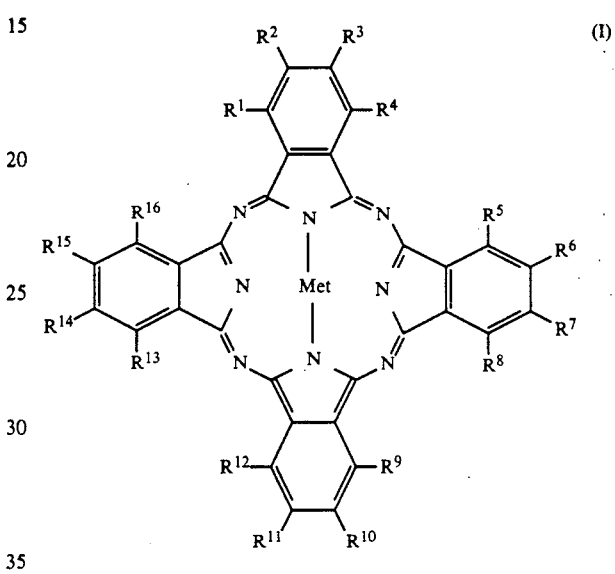

wherein $R^1$, $R^4$, $R^5$, $R^8$, $R^9$, $R^{12}$, $R^{13}$ and $R^{16}$ independently are alkyl, arylmethyl, alkoxymethyl, alkylthiomethyl, alkylaminomethyl, dialkylaminomethyl, aryloxymethyl, arylthiomethyl, arylaminomethyl, diarylaminomethyl or alkylarylaminomethyl, wherein the total number of carbon, oxygen, nitrogen and sulfur atoms present in each of $R^1$, $R^4$, $R^5$, $R^8$, $R^9$, $R^{12}$, $R^{13}$ and $R^{16}$ is the range of 5 to 12; $R^2$, $R^3$, $R^6$, $R^7$, $R^{10}$, $R^{11}$, $R^{14}$ and $R^{15}$ independently are hydrogen, alkyl, arylmethyl, alkoxymethyl, alkylthiomethyl, alkylaminomethyl, dialkylaminomethyl, aryloxymethyl, arylthiomethyl, arylaminomethyl, diarylaminomethyl, alkylarylaminomethyl, alkylthio, arylthio, alkoxy, aryloxy or aryl; and Met is two hydrogen atoms, a divalent metal atom, a monosubstituted trivalent metal atom, a distributed tetravalent metal atom or an oxymetal group.

6. The optical recording medium of claim 5, wherein $R^1$, $R^4$, $R^5$, $R^8$, $R^9$, $R^{12}$, $R^{13}$, and $R^{16}$ independently are alkyl or arylmethyl groups having 5 to 12 carbon atoms.

7. The optical recording medium of claim 5, wherein $R^2$, $R^3$, $R^6$, $R^7$, $R^{10}$, $R^{11}$, $R^{14}$ and $R^{15}$ independently are alkyl, arylmethyl, alkoxymethyl, alkylthiomethyl, alkylaminomethyl, dialkylaminomethyl, aryloxymethyl, arylthiomethyl, arylaminomethyl, diarylaminomethyl or alkylarylaminomethyl.

8. The optical recording medium of claim 6, wherein $R^2$, $R^3$, $R^6$, $R^7$, $R^{10}$, $R^{11}$, $R^{14}$ and $R^{15}$ independently are alkyl or arylmethyl groups having 5 to 12 carbon atoms.

* * * * *